(12) United States Patent
Chiang et al.

(10) Patent No.: US 7,253,130 B2
(45) Date of Patent: Aug. 7, 2007

(54) METHOD FOR MAKING TRANSPARENT CONTINUOUS ZEOLITE FILM AND STRUCTURE OF THE ZEOLITE FILM

(75) Inventors: Anthony S. T. Chiang, Jungli (TW); Gorden Shu, Jungli (TW); Jaming Liu, Jungli (TW); Rosilda Selvin, Jungli (TW)

(73) Assignee: National Central University, Taoyuan (TW)

( * ) Notice: Subject to any disclaimer, the term of this patent is extended or adjusted under 35 U.S.C. 154(b) by 533 days.

(21) Appl. No.: 10/942,359

(22) Filed: Sep. 15, 2004

(65) Prior Publication Data

US 2005/0070424 A1   Mar. 31, 2005

(30) Foreign Application Priority Data

Sep. 30, 2003 (TW) .............................. 92126943 A

(51) Int. Cl.
*B01J 35/00* (2006.01)

(52) U.S. Cl. .............................. 502/4; 502/60; 502/64; 502/77; 423/DIG. 22; 427/377; 427/380; 427/397.7; 427/397.8; 427/443.2; 427/240; 427/427

(58) Field of Classification Search ............... 502/4, 502/60, 64, 77; 423/DIG. 21; 427/377, 427/380, 397.7, 397.8, 443.2, 240, 427

See application file for complete search history.

(56) References Cited

U.S. PATENT DOCUMENTS

| 5,258,339 A | * | 11/1993 | Ma et al. ....................... 502/4 |
| 5,871,650 A | * | 2/1999 | Lai et al. ...................... 210/653 |

* cited by examiner

*Primary Examiner*—David Sample
(74) *Attorney, Agent, or Firm*—J.C. Patents

(57) ABSTRACT

A method for making transparent continuous zeolite film is provided. First a transparent precursor sol is prepared, and the precursor sol is processed to a specific concentration. The precursor solution is coated on a surface of a substrate which is heated under an ambiance of 120~250° C. in temperature and a humidity less than saturated humidity. The packing of zeolite nanocrystals in the film converted from coated precursor sol has preferred orientation and the film shows super-hydrophobic property.

22 Claims, 8 Drawing Sheets

(a)  (b)

(c)  (d)

(a)  (b)

(c)  (d)

(a) (b)

(c) (d)

METHOD FOR MAKING TRANSPARENT CONTINUOUS ZEOLITE FILM AND STRUCTURE OF THE ZEOLITE FILM

CROSS-REFERENCE TO RELATED APPLICATION

This application claims the priority benefit of Taiwan application serial no. 92126943, filed on Sep. 30, 2003.

BACKGROUND OF THE INVENTION

1. Field of the Invention

The present invention relates to the preparation of a zeolite film on a substrate, and more particularly to the preparation of a continuous and transparent zeolite film having substantial preferred crystallographic orientation on a substrate.

2. Description of the Related Art

Zeolite, which is a member of a family of minerals known as tectosilicates, is microporous crystalline material with high internal surface area formed by three-dimensional open framework of tetrahedral $SiO_4$ units connected by oxygen atoms thereof. Aluminum or other atoms, leading to negative charges that must be neutralized by cations, may replace the silicon atoms in the zeolite framework. Tremendous zeolite exists in nature whereas synthetic zeolite, not being found in nature, has been prepared and is commercially available.

Although the three-dimensional framework structure of zeolite, as well as the resulted pore size and volume of crystal structure thereof, differs from case to case, the pore size in general falls in the range of 0.3 to 1.0 nm. Due to the molecular sized pore structure, zeolite is frequently used as molecular selective catalysts and adsorbent. In such applications, zeolite is usually employed in the form of powder, pellet and even other particle forms.

Zeolite in the form as polycrystalline film on a porous substrate has been disclosed for various membrane applications. For embodiment, U.S. Pat. No. 4,699,892 (1987) describes the preparation of a permeable composite zeolite membrane for the selectively separation of materials. U.S. Pat. No. 5,258,339 (1993) describes a method of forming a zeolite membrane by contacting a porous support with a sol composition, and hydrothermally converting the composition into a zeolite membrane. A long list of other patens has been published on a variety of improvements for the preparation of supported zeolite membrane. (U.S. Pat. No. 5,266,542 (1993), U.S. Pat. No. 5,464,798, U.S. Pat. No. 5,429,743 (1995), U.S. Pat. No. 5,567,664 (1996), U.S. Pat. No. 5,605,631 (1997), U.S. Pat. No. 5,895,769, U.S. Pat. No. 5,871,650 (1999), U.S. Pat. No. 6,051,517, U.S. Pat. No. 6,140,263, U.S. Pat. No. 6,159,542 (2000), U.S. Pat. No. 6,193,784 and U.S. Pat. No. 6,197,427 (2001))

In addition to zeolite membrane, a zeolite film coated on a non-porous substrate also finds applications. For embodiment, U.S. Pat. No. 5,151,110 zeolite was coated on piezoelectric substrate for nanogram level detection of chemicals. U.S. Pat. No. 5,841,021 dispersed zeolite in a nonporous polymer membrane coated on electrode for sensor application. U.S. Pat. No. 5,843,392 described the coating of substantially orientated zeolite crystals on structured support for catalytic purpose. US patent application 20010008662 described the combination of oxygen scavenger layer and a zeolite layer as an active oxygen barrier packaging materials. US patent application 20020110699 disclosed that zeolite coating on metal surface functions as protection against corrosion. For applications such as protective against corrosion or as gas barrier, the zeolite coating must be continuous and without inter-crystalline void.

Other potential applications for zeolite coating ranged from molecular selective sensor, electrode, as low refractive index layer, electro-optical component, low κ dielectric film (Wang et al., 2001) and anti-microbial coating (Cowan et al. 2003) for metals. The most interesting possible applications may be in the electro-optical field. The potential of using zeolite in optics was demonstrated more than a decade ago by Ozin (1989), who was able to prepare CdS clusters in the ordered cavities of Y zeolite single crystal to form aligned quantum dots. Marlow et al. (1994, 1996) later demonstrated that dipolar chromophores (p-nitroanilin) adsorbed in large $AlPO_4$-5 crystals aligned into long dipole chain and acted as second harmonic generator. Following the same direction, Calzaferri et al. (2001, 2003) loaded zeolite L with dye to prepare an optical antenna. The entrapment of guest molecules in cages of zeolite has attracted a great deal of attentions for its possibility in manipulating both the optical properties of the guest molecule and host structure. However, to realize the potential opto-electronic applications, the zeolite framework must first be grown to a manageable size or coated on substrate as macroscopic oriented film. It is further desirable that the so coated film is transparent. To capitalize on the possibility of aligned dipoles, a preferred orientation of the crystallographic plans is needed.

There are roughly three general procedures known for the preparation. A typical way is called in-situ hydrothermal crystallization. This comprises of immersing the substrate in a synthesis solution, and heating the substrate and solution to high temperature under autogeneous pressure. During the process, heterogeneous nucleation of zeolite occurs on the substrate surface, from which zeolite film is grown. Such in-situ hydrothermal crystallization approach was claimed in U.S. Pat. No. 4,699,892 for the preparation of zeolite membrane, and was described in US patent application No. 20020134995 for the preparation of low dielectric layer on silicon wafer. However, the zeolite film obtained in this approach is usually relative thick and without preferential orientation, and its inter-crystalline void is difficult to eliminate.

Another approach as described by U.S. Pat. No. 5,258,339 is to coat a porous substrate with fresh zeolite synthesis sol that will gel before fully penetrating the porous substrate, and treat the coated substrate under saturated water vapor to convert the gel to zeolite. Again, the zeolite coating produced is relative thick and without preferential orientation.

Yet another approach, as disclosed by International Applications PCT/EP93101209, and PCT/US95/08514 published as WO 96/01687, is the deposition of previously formed zeolite micro- or nanocrystals as nucleation layers on substrates before the in-situ hydrothermal process. The zeolite film obtained shows some preferred orientation. To improve the orientation, U.S. Pat. No. 6,177,373 describe the preparation of a dispersion comprising discrete microcrystals of zeolite which have a surface charge. The charged microcrystals are then attached to a substrate with opposite surface charge to form a monolayer. The substrate comprising a monolayer of zeolite is then calcined in steam to a temperature between 200 to 1000.° C. to fix said monolayer in place. Due to the monolayer attachment of microcrystals on the substrate, they are oriented in similar direction. However, these procedures are complicate since it involves the preparation and separation of microcrystals in the first step, and the coating and calcination in a second step.

SUMMARY OF THE INVENTION

Accordingly, the present invention provides a method to avoid the disadvantages associated with the above known prior arts for forming zeolite films and to present a new and easier procedure for the preparation of a continuous, transparent and preferred oriented film of zeolite on substrate.

The key aspects in the process of the present invention are the use of zeolite precursor as the coating sol. This is different from U.S. Pat. No. 6,177,373 where a monolayer of pre-synthesized microcrystal was formed on the substrate. Furthermore, the coated precursor film is converted to zeolite nanocrystals by heating the coated substrate under a less than saturation humidity conditions. This is different from the saturation humidity condition employed in U.S. Pat. No. 5,258,339, or as the hydrothermal condition conditions employed in most zeolite synthesis. It was found, in fact, the coated precursors is heated at lower relative humidity for a period, and then continue the heating under higher relative humidity to obtain the best result. Lastly, the addition of surfactant to this zeolite precursor sol is found effective to induce the preferential orientation of the nanocrystals in the zeolite film so produced.

The method in the present invention for the formation of a zeolite film is different from all previous arts by the applying of a zeolite precursor sol instead of pre-formed zeolite nanocrystals suspension to the substrate, and directly converted the precursor to zeolite film by heating under less than saturated humidity condition. It is further different from the previous knowledge in that the precursor sol consists of surfactant in addition to the silicon, aluminum and other metal oxide sources needed to form zeolite. Finally, the obtained zeolite film is made of closely packed nanocrystals and has preferential orientation and is transparent to naked eye.

Zeolite precursor: The term zeolite precursor is used here to differentiate it from zeolite crystals that show distinct X-ray diffraction peaks. The zeolite precursor sol is also different from the compositions freshly prepared for the conventional synthesis of zeolite in the sense that discrete nanoparticles less than 15 nm in size, detectable with laser scattering instrument and showing particular infrared absorption at ~550 cm$^{-1}$, have formed after adequate thermal treatment. It is further different from the colloidal zeolite by its transparency, which indicates the absence of particles larger than 50 nm. The said zeolite precursor has been described in recent publications of Naik et al. (2002, 2003). Without binding to any theory, it could also be the "nanoslab" suggested by Kirschhock et al. (2001).

The zeolite precursor sol in the present invention is prepared by mixing a silica source, a zeolite structure-directing agent (SDA), optional aluminum or other substitution atoms and water to form a clear composition. Heat the clear composition at below 100° C. for a time less than 24 hours, so that zeolite precursors are formed but the composition remains as a clear sol. This is unlike the processes described by U.S. Pat. No. 6,177,373 or US patent application No. 20020060364, where the hydrothermal reaction was carried to the extent that discrete colloidal zeolite is formed.

For better coating result, the zeolite precursor sol is concentrated by removing excess water. Afterward, a surfactant dissolved in a solvent is added. If cationic surfactant is to be used, it is important to remove most of the water in the system to avoid the formation of strong ionic bonds between the precursor and the cationic surfactant that leads to immediate precipitation. Non-ionic surfactant is preferred because it is more tolerant to water. Any surfactant can be used as long as it does not alter the transparency of the precursor sol. The surfactant containing precursor sol is further diluted with solvents to the desired concentration for better coating.

The precursor in the present invention is then coated on a substrate by, for example, dip coating, spin coating, spray coating or any other method that can form a thin coating of the substrate surface. The coated substrate is then placed in a steamer, where the temperature and the relative humidity can be separately controlled.

The coated precursor film is then converted to zeolite film by the application of heat under less than saturated humidity. After the conversion is completed, the heating can be continued at a higher temperature to facilitate the removal of organic substances in the zeolite film and improvement of bonding between the zeolite film and the substrate, or be rinsed with solvent to remove the surfactant before such heating.

DESCRIPTION OF THE PREFERRED EMBODIMENTS

Figure 1:
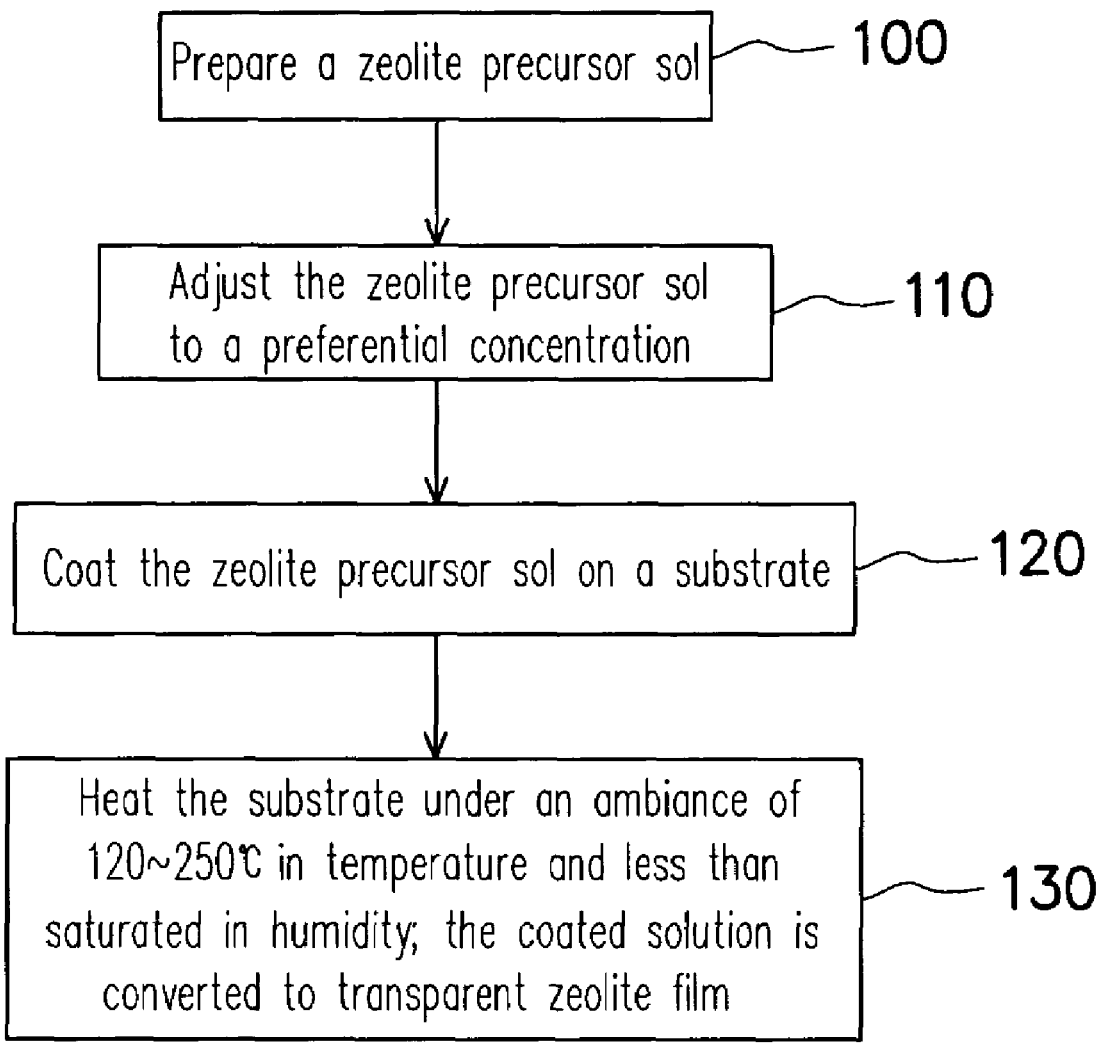
FIG. 1 is a schematic flow chart illustrating process steps of transparent zeolite film according to one preferred embodiment of the present invention.

Referring to FIG. 1, a flow chart diagram of the method of processing transparent continuous zeolite film and structure of the zeolite film is illustrated herein. First, a zeolite precursor sol is prepared in step 100. In step 100, a silica source, a metal atom, water, and zeolite structure-directing agent (SDA) are heated and mixed to a sol, where the heating temperature is below 100° C., for example. Next in step 110, processing the precursor sol to a specific concentration. Then a surface of a substrate, porous or non-porous, is coated with the precursor sol in step 120. Heating up the coated substrate under an ambience of about 120° C. to about 250° C. in temperature and a humidity less than saturated humidity, so that to covert the precursor sol to a transparent zeolite crystalline film, as stated in step 130. In order to employ the foregoing method as shown in FIG. 1 according to the present invention, four preferred embodiments are demonstrated including various precursor sols, surfactants, heating processes, and preferred orientations, respectively.

Embodiment 1

Standard Coating Sol 11.5782 gm of Tetraethoxysilane (TEOS,>98%) is dissolved in 7.0712 gm of aqueous tetrapropyl ammonium hydroxide (TPAOH, 40% aq) and 79.8 gm of deionized water. The mixture is stirred under room temperature for about 45 minutes to obtain a clear solution. The solution is then heated at 80° C. for 18 hours in a sealed bottle. The result is a clear precursor sol A for silicalite.

0.3 gm of non-ionic surfactant Tween-20 was added to 40 gm of the above precursor sol A and stir for 10 minutes to prepare an undiluted coating sol A1. Take 4.02 gm of the A1 coating sol and dilute with 36.3 gm of 95% ethanol to produce the diluted coating sol B1.

Figure 2:
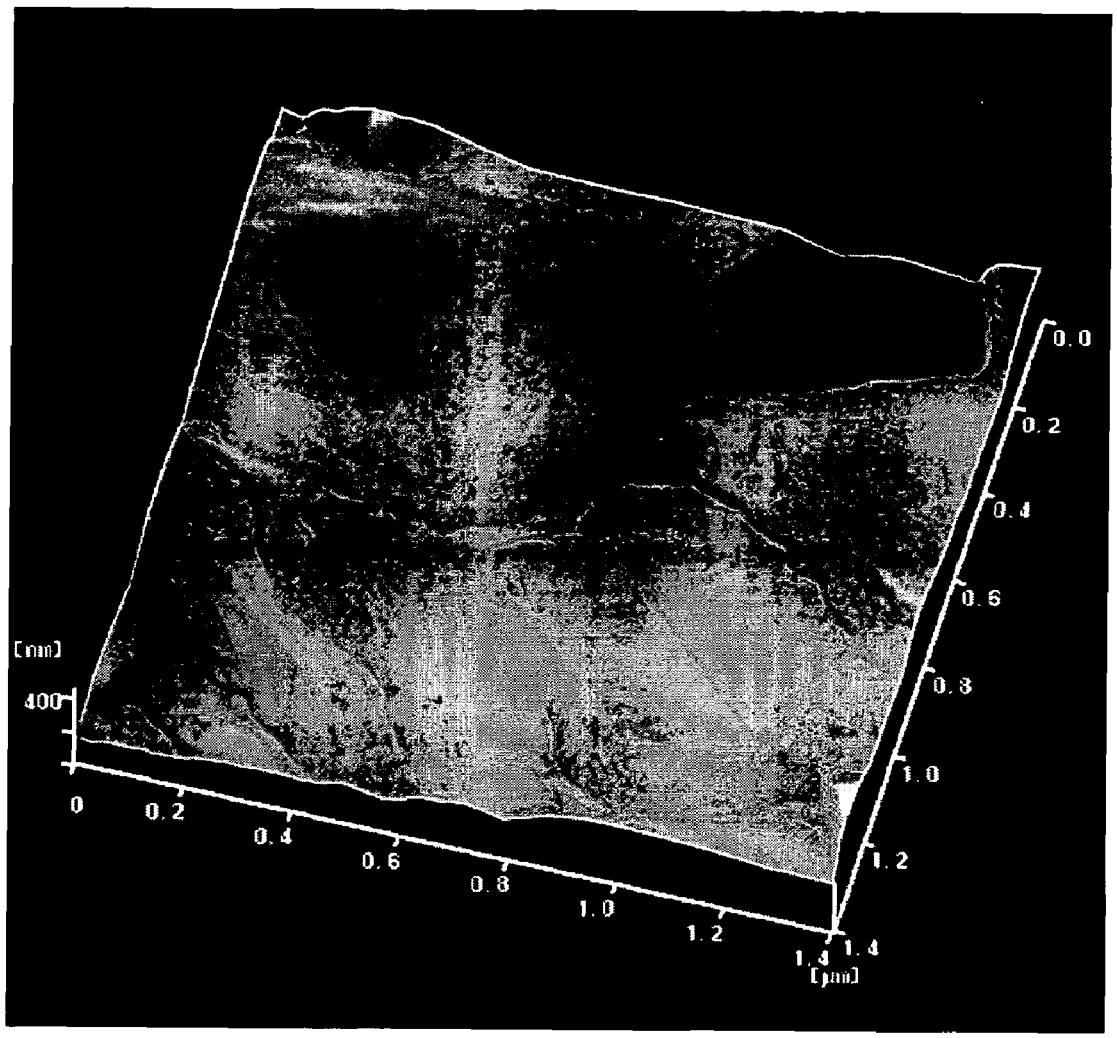
FIG. 2 is a morphology demonstrating the coated surface prepared from coating sol A1 as observed by Atomic Force Microscope according to one preferred embodiment of the present invention.
Figure 3:
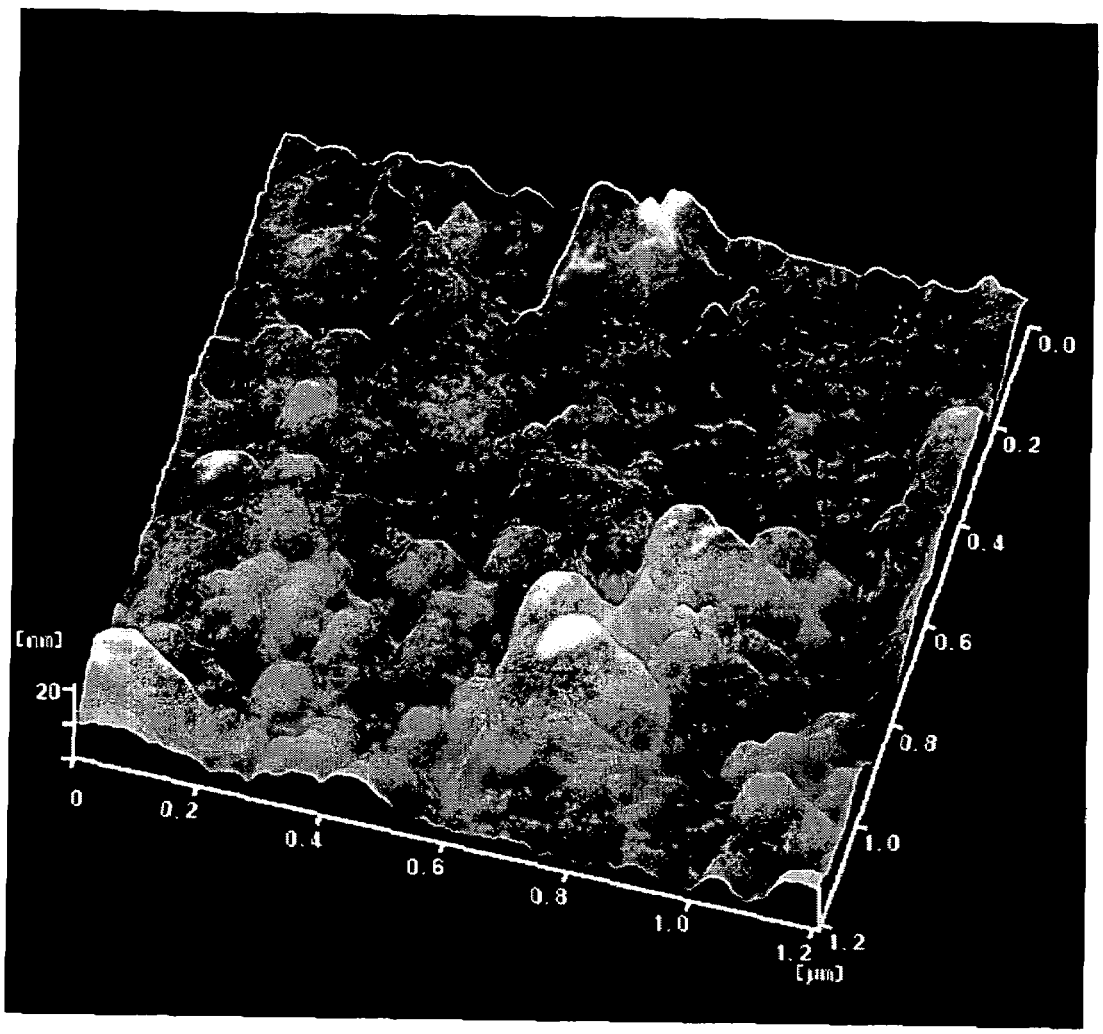
FIG. 3 is a morphology demonstrating the coated surface prepared from coating sol B1 as observed by Atomic Force Microscope according to one preferred embodiment of the present invention.
Figure 4:
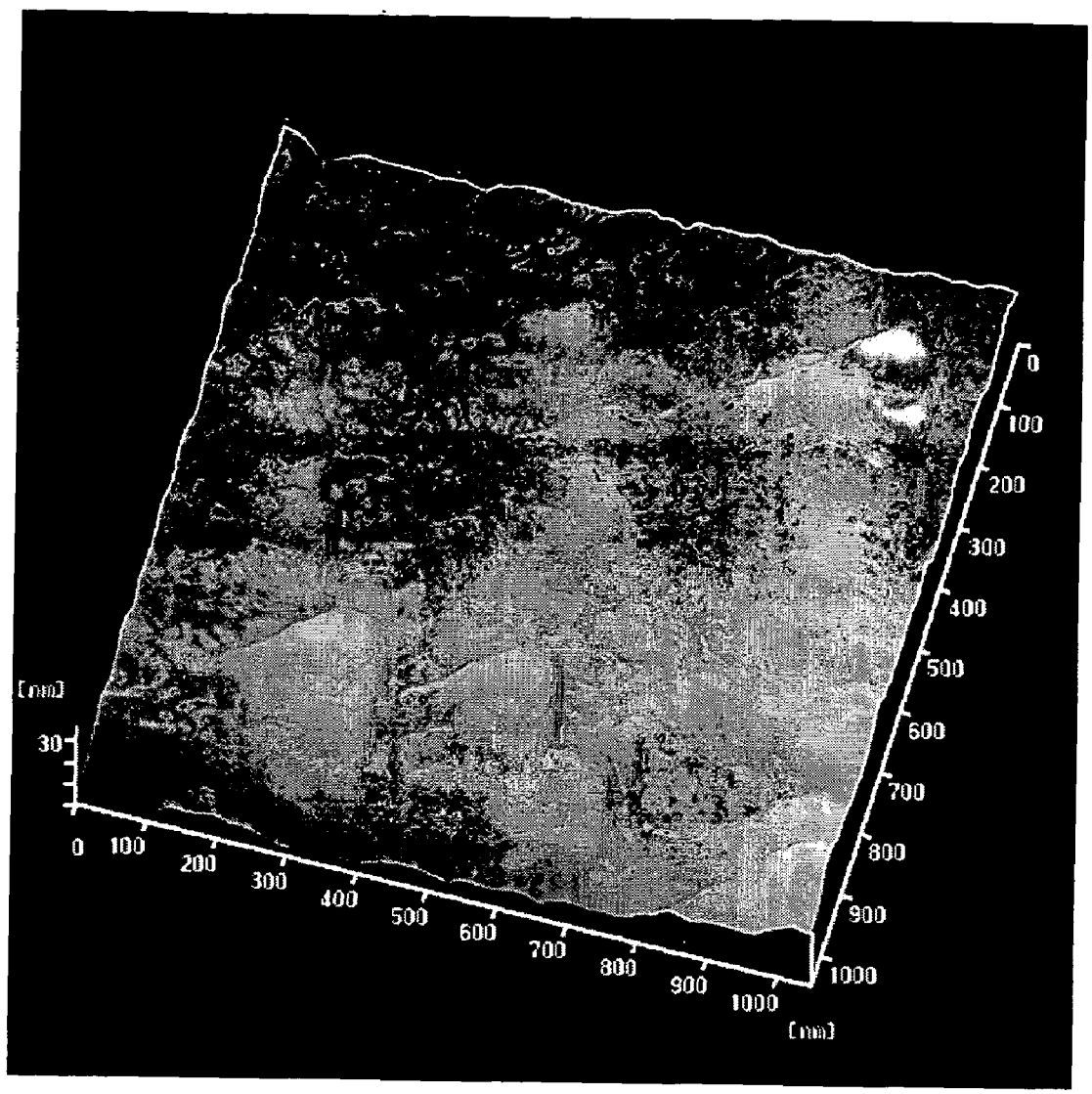
FIG. 4 is a morphology demonstrating another region on the coated surface prepared from coating sol B1 as observed by Atomic Force Microscope according to one preferred embodiment of the present invention. prepared from coating sol B1 as observed by Atomic Force Microscope according to one preferred embodiment of the present invention.

Thoroughly washed glass slides were used as substrate and were dip coat with both A1 and B1 sol. The dip coating was made with 30 second of immersion, and pulling rate of 4 cm/min. The coated glass slides were dried at 80° C. for 1 hour and then put into a steamer as demonstrated in FIG. 1. The steamer was set to 150° C. and 55% RH for 3 hours and then increase the humidity to 90% for another 3 hours. After cooling the steamer to room temperature, the glass slides were retrieved. It was found that undiluted sol A1 produced only hazed coating while the diluted coating sol produced transparent coating. The coated slides were then heated in a tubular oven and, at a rate of 5° C./min, to 350° C. and held for 6 hours. The surface of the coated glass slides was then observed with Atomic force microscope. In FIGS. 2 to 4 the observed surface morphologies are shown. It can be seen that continuous and large crystals were formed on the surface coated with undiluted sol A1, while particles smaller then 100 nm in size were observed on slide coated with diluted sol B1. The surface roughness of the later was less then 20 nm. Furthermore, it was observed that these particles were arranged in certain triangular order, as demonstrated in FIG. 4. The span of the triangular pattern was larger than several micrometers.

Embodiment 2

Effect of Different Surfactants

Figure 5:
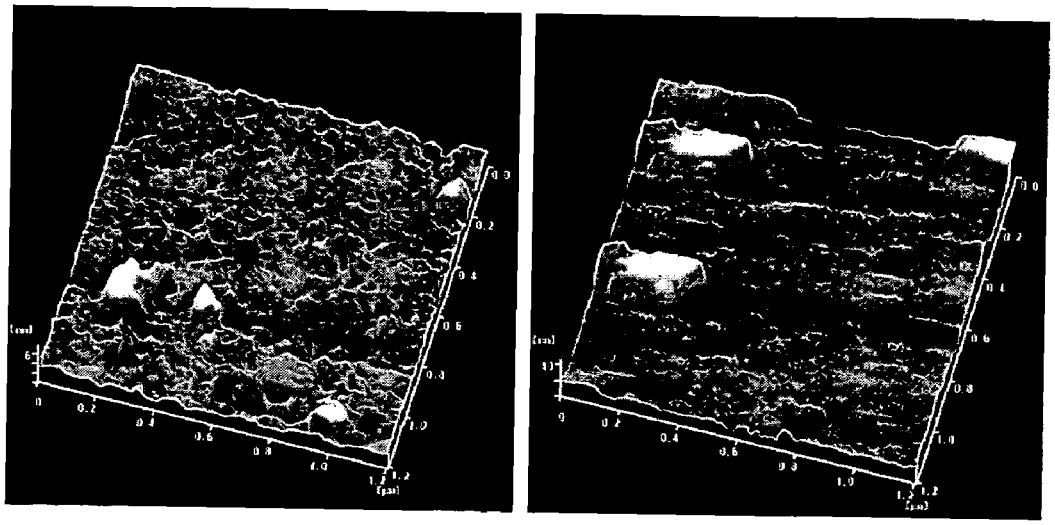
FIG. 5 is a morphology demonstrating the coated surface prepared from coating sol A2 with different surfactants: (a) tween20, (b) tween60, (c) P123, and (d) no surfactant, as observed by Atomic Force Microscope according to one preferred embodiment of the present invention.
Figure 5:
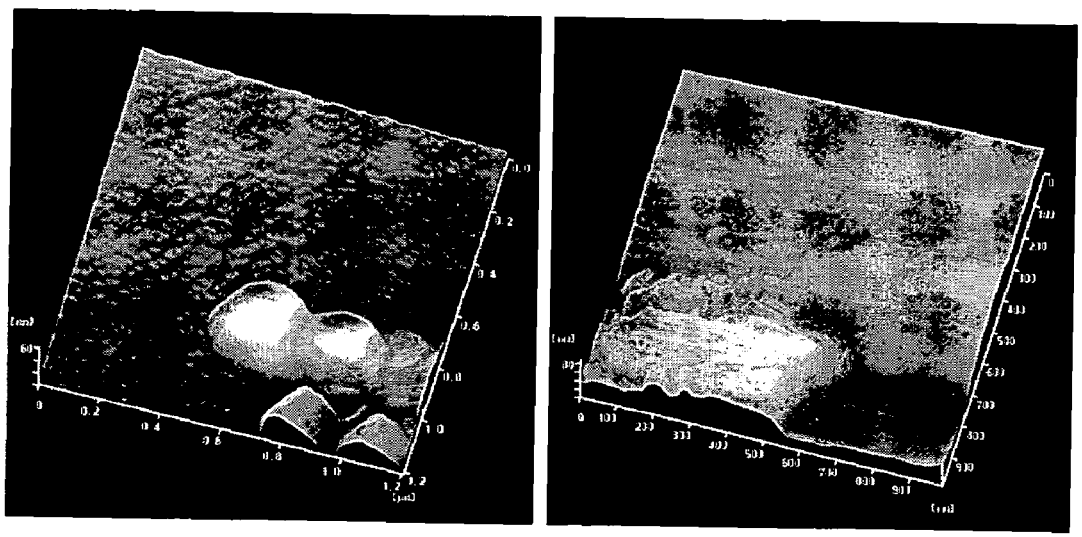

The same precursor sol A as prepared in EMBODIMENT 1 was used as the starting material to test the effect of different surfactant. In each case, 4.04 gm of the precursor sol was diluted with 36 gm of ethanol in which 0.036 gm of a non-ionic surfactant (tween-20m tween-60 and P123 respectively) was placed. 0.034 gm of ethylene Glycol was added to this diluted sol to complete the preparation of coating sol. Cleaned glass slides were coated with different coating sold and steamed and calcined as before. The surface morphology was then observed under AFM as demonstrated in FIG. 5. The case with tween-20 gave a surface with fine nanostructure and roughness less than 10 nm. That prepared with tween-60 gave larger particles arranged toward one direction. The one prepared with P-123 showed a few very large particles but otherwise very smooth surface. Finally, the diluted coating sol without any surfactant gave only large inter-grown crystals.

Embodiment 3

The Necessity of Heating During Precursor Preparation

Figure 6:
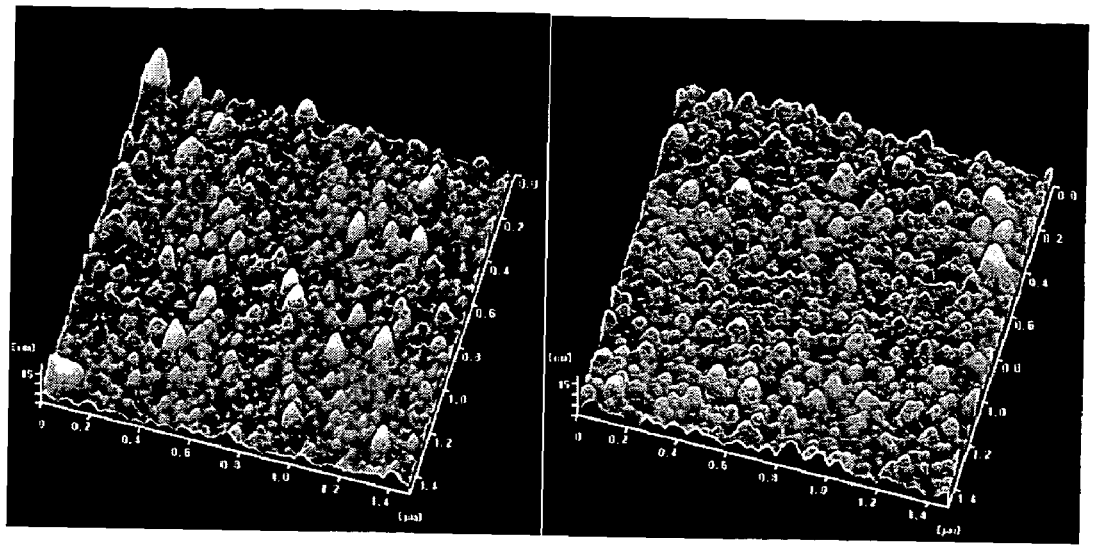
FIG. 6 is a morphology demonstrating the coated surface prepared from coating sol with unheated precursor (a, c) and heated precursor (b, d) as observed by Atomic Force Microscope according to one preferred embodiment of the present invention.
Figure 6:
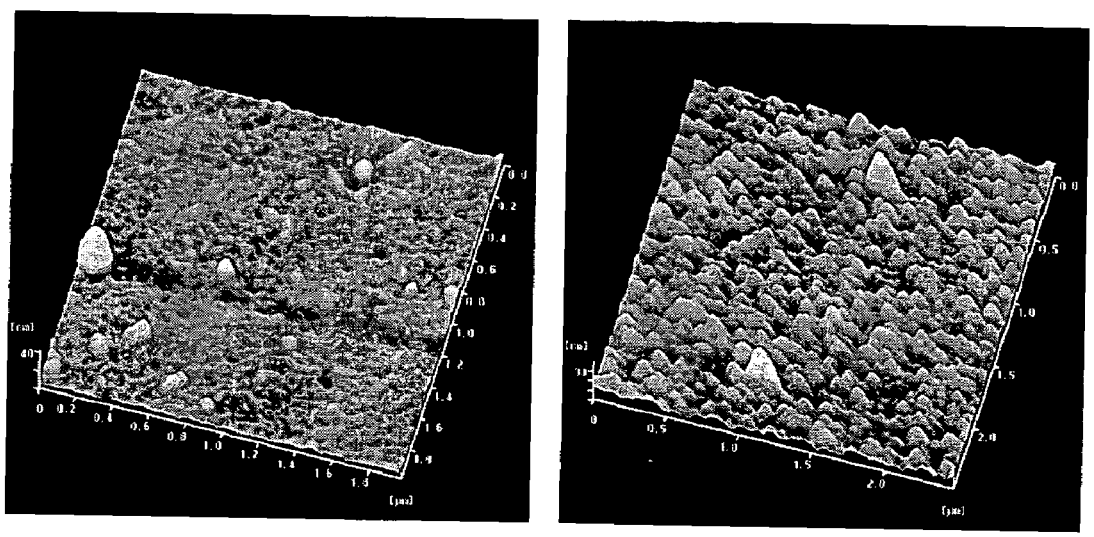
Figure 7:
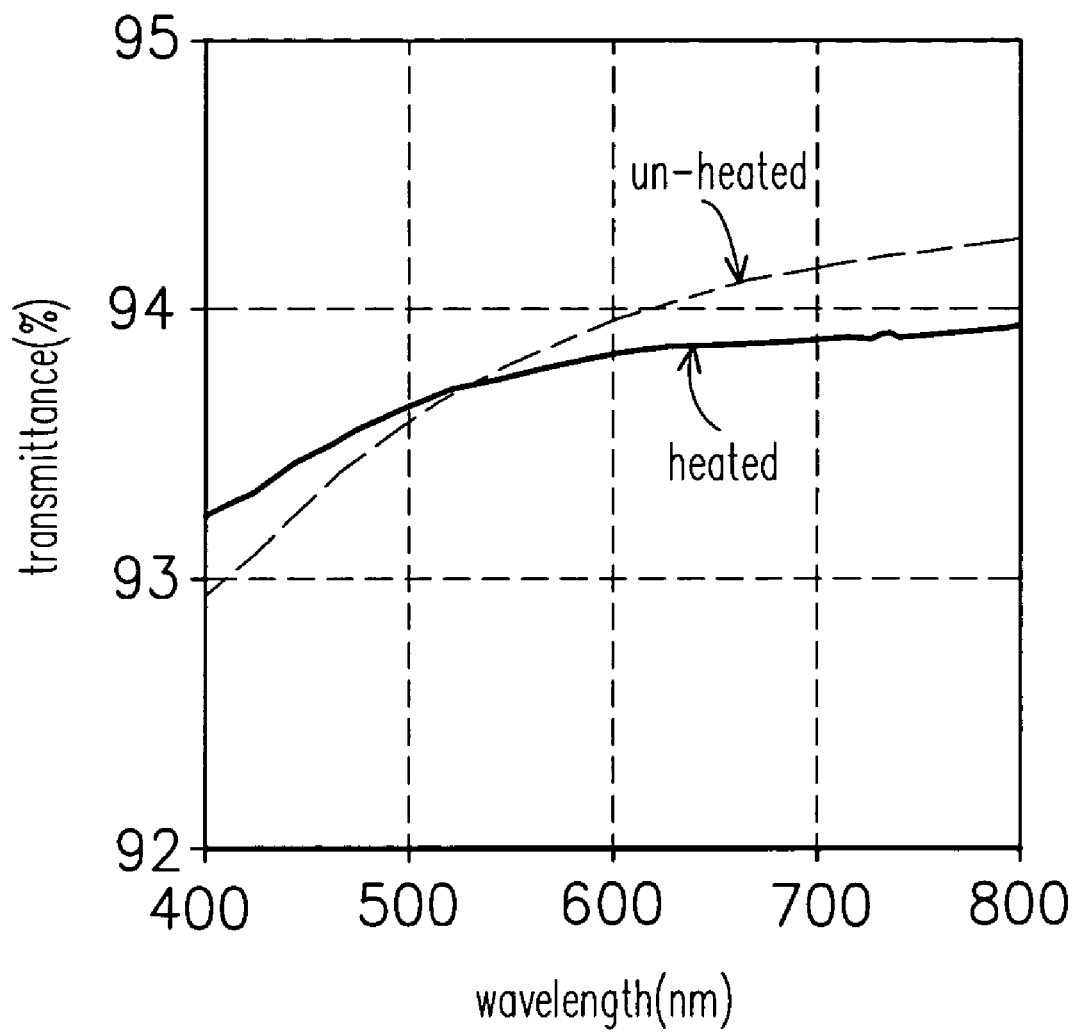
FIG. 7 is a diagram illustrating optical transmittance of glass slides coated with zeolite films using unheated and heated precursors according to one preferred embodiment of the present invention.

The same mixture of TEOS/TPAOH and water as described in EMBODIMENT 1 was prepared and split into two parts. One part was heated to 80° C. as before, while the other part was used without the heating step. Both solutions were then diluted with ethanol and added with tween-20 as before. Glass slides were then coated with both types of the coating sols then steamed and calcined as usual. As observed in FIG. 6, the one prepared from un-heated precursor gave a broader particle size distribution while the particles produced from the heated sol was more uniform. The ratio of surfactant to silica did not affect the morphology of the coating produced from the heated precursor but markedly changed that of the coating produced from the un-heated precursor sol. However, the optical transmittance of both coating were better than 95% as demonstrated in FIG. 7.

Embodiment 4

Preferential Orientation of Zeolite Particles

Figure 8:
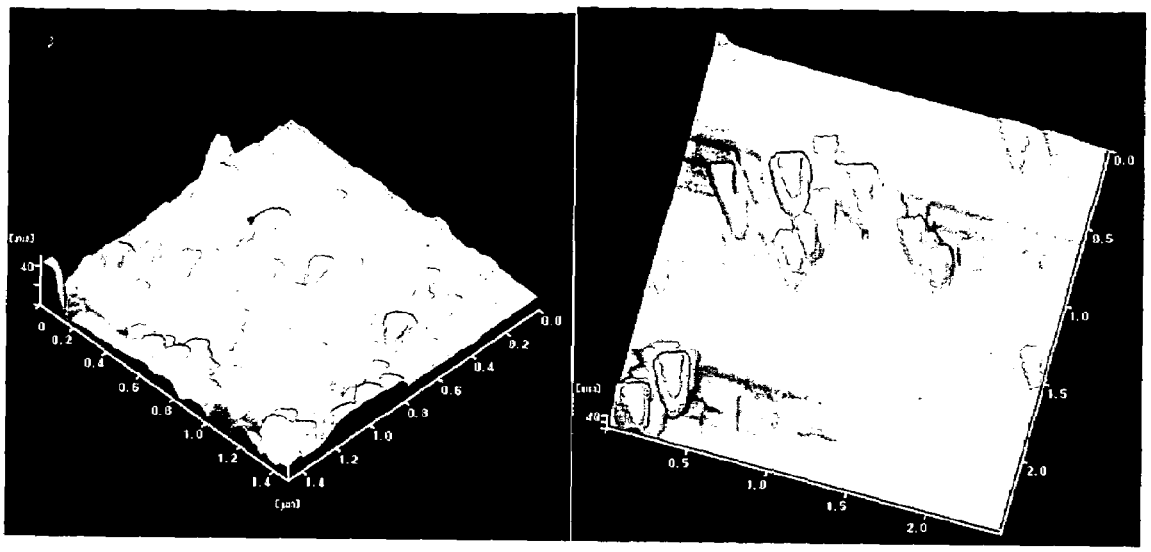
FIG. 8 is a morphology demonstrating the ordered zeolite films prepared from the coating sol according to one preferred embodiment of the present invention.
Figure 8:
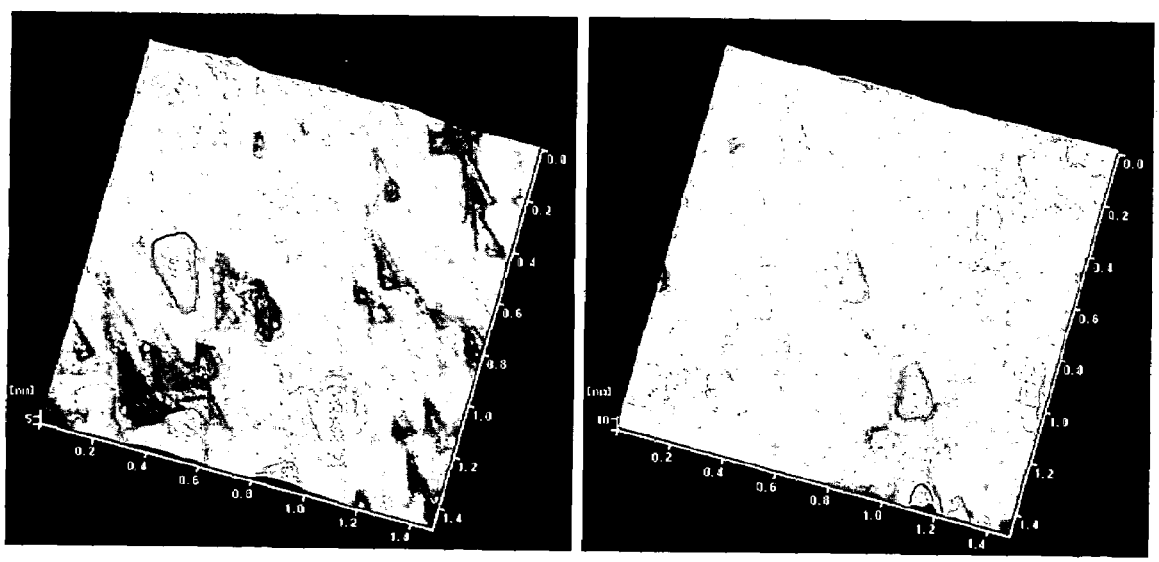

The same TEOS/TPAOH/Water recipe was prepared and heated to 80° C. for 18 hours. The produced precursor sol was first vacuum distillated to remove most of the water and ethanol, and then diluted with 95% ethanol and various amount of tween-20 surfactant to make a coating sol having ~0.3 wt % $SiO_2$. Glass slides coated with these coating sols were steamed and calcined before the examination under AFM. The results were demonstrated in FIG. 8, where we observed that triangular shaped crystals, ~300 nm in length and ~100 nm at base, were aligned toward the same direction. This is independent of the surfactant to silica ratio as well as the dilution of ethanol.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

What is claimed is:

1. A method for producing a transparent zeolite film, comprising:
    A. preparing a precursor sol capable of forming zeolite;
    B. processing the precursor sol to a specific concentration;
    C. coating the precursor sol to a surface of a substrate; and
    D. heating the coated substrate under a temperature between about 120° C. and about 250° C., and under a humidity less than a saturated humidity to convert the precursor sol to the transparent zeolite film.
2. The method as recited in claim 1, wherein the step A comprises heating up the precursor sol, the precursor sol comprising a silica source, a metal atom, water and a zeolite structure-directing agent (SDA).

3. The method as recited in claim 2, wherein a temperature used for heating up the precursor sol is lower than 100° C.

4. The method as recited in claim 2, wherein the step of heating up the precursor sol is terminated before forming a suspended zeolite.

5. The method as recited in claim 2, wherein a first molar ratio of the structure-directing agent (SDA) to the silica source is from 0.2 to about 0.6, and a second molar ratio of water to the silica source is from 40 to 150.

6. The method as recited in claim 2, wherein the silica source is C1-C2 alkyl orthosilicate.

7. The method as recited in claim 2, wherein the structure-directing agent (SDA) is quaternary ammonium hydroxide or a salt thereof.

8. The method as recited in claim 2, wherein the preparing zeolite precursor sol the silica source is ethyl orthosilicate and the structure-directing agent is tetrapropylammonium hydroxide.

9. The method as recited in claim 2, wherein the metal atom comprises aluminum.

10. The method as recited in claim 1, wherein the step B comprises concentrating the zeolite precursor sol to the specific concentration.

11. The method as recited in claim 1, wherein the step B comprises diluting the zeolite precursor sol to the specific concentration with a solvent.

12. The method as recited in claim 11, wherein the solvent comprises a mixture of water and an alcohol containing less than 6 carbon atoms.

13. The method as recited in claim 1, wherein the step B further comprises adding a surfactant to the zeolite precursor sol.

14. The method as recited in claim 13, wherein the surfactant is a diblock copolymer of polyethylene oxide and polypropylene oxide or a triblock copolymer of polyethylene oxide and polypropylene oxide.

15. The method as recited in claim 13, wherein the specific concentration is less than 10 grams per liter.

16. The method as recited in claim 1, wherein the step C comprises a step selected from a group consisting of spin coating, dip coating, and spray coating.

17. The method as recited in claim 1, wherein the step D is performed for about 2 to about 12 hours.

18. The method as recited in claim 1, wherein the humidity in the step D is between about 30% and about 98%.

19. The method as recited in claim 1, after the step D, the method further comprising heating the coated substrate to between about 350° C. to about 550° C. under air for removing organic substances in the transparent zeolite film.

20. The method as recited in claim 1, wherein crystal lattice sizes of zeolite crystals are smaller than 100 nm, so that the zeolite film is transparent.

21. The method as recited in claim 1, wherein a material of zeolite is high silica MFI zeolite.

22. The method as recited in claim 1, wherein a material of zeolite is pure silica MFI zeolite.

* * * * *